May 31, 1927.

R. E. COLLINS

RACK FOR ROASTERS

Filed Jan. 26, 1926

1,630,471

R. E. Collins
Inventor,

By C. A. Snow & Co.
Attorneys.

Patented May 31, 1927.

1,630,471

UNITED STATES PATENT OFFICE.

ROLLIN E. COLLINS, OF PARNASSUS, PENNSYLVANIA, ASSIGNOR TO THE ALUMINUM COMPANY OF AMERICA, OF PITTSBURGH, PENNSYLVANIA.

RACK FOR ROASTERS.

Application filed January 26, 1926. Serial No. 83,900.

This invention relates to a lifting rack designed primarily for use within a roasting pan whereby it becomes possible readily to remove the contents of the roaster without burning the hands.

Racks for this purpose have heretofore been devised but they have all been objectionable primarily because the handle portions thereof have been so mounted as to render the structure bulky, thereby preventing compact storage or packing for shipping purposes.

It is an object of the present invention to provide a rack having handles so mounted that, when the rack is not in use these handles can be folded against one surface of the rack, thereby enabling the device to be conveniently stored in a pantry or to be compactly folded for shipping purposes.

A further object is to provide a lifting rack the handles of which, when in use, will be supported away from the sides of the roaster sufficient distances to permit the user to readily grasp them with the hands holding a cloth and without danger of burning the hands.

A still further object is to so mount the handles that they will be supported in upstanding position and not fall inwardly and downwardly onto the rack or onto the contents thereof.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawings.

Referring to the figures by characters of reference 1 designates a plate of the usual or any preferred configuration provided, at its sides and ends with depending flanges 2 constituting supports adapted to rest upon the bottom of a roasting pan P or the like.

Figure 1:
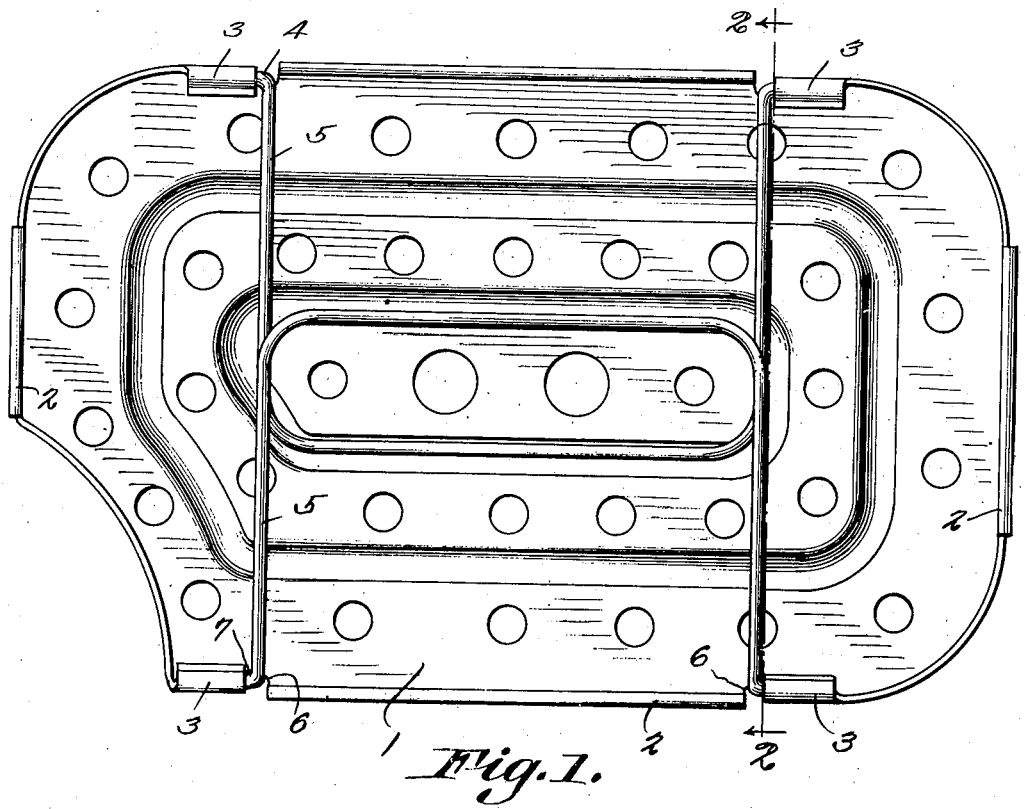
Figure 1 is a bottom plan view of the lifting rack, the handles being shown folded thereagainst for storage or shipping purposes.

Ears 3 are provided adjacent the ends of these flanges 2 and are bent inwardly and upwardly against the bottom of the plate 1 so as to provide opposed pairs of sleeves or bearing members as shown particularly in Figure 1. Journaled within the bearing members of each pair are the outturned terminals 4 of a bail-shaped handle 5 which can be formed of a stiff wire. Two of these handles are provided and, as the bearing members 3 are located below the bottom surface of the plate 1, it will be apparent by referring to Figure 1 of the drawings and to the dotted positions of the handles in Figure 2, that these handles can fold together under the bottom of the plate within the space surrounded by the flanges 2.

Figure 2:
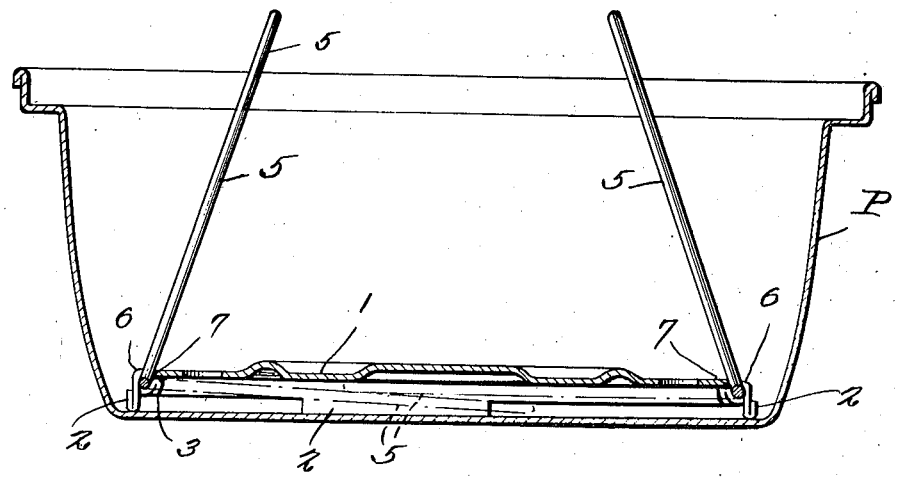
Figure 2 is a transverse section through the rack in position within a roasting pan, the handles being shown in upstanding positions, the sections through the rack being taken on the lines 2—2 Figure 1.

Notches 6 are provided in the side edges of the plate 1 close to the bearing members 3. Consequently when the handles 5 are swung from under the plate 1 and into upstanding positions, they will rest against shoulders 7 formed by the inner walls of these notches. These shoulders, as illustrated in Figure 2, will support the handles 5 in upwardly converging positions so that sufficient spaces are provided between the handles and the sides of the pan P to allow the hands of the user to insert a cloth into engagement with the handles and to enable the rack to thus be lifted without danger of burning the hands. Furthermore the shoulders prevent the handles from falling downwardly onto the plate 1 or onto the material supported by the plate.

What is claimed is:

1. A lifting rack for roasting pans and the like including a plate, a marginal supporting flange therefor, there being a pair of notches in each side portion of the plate intersecting the flange, an inturned ear adjacent each notch providing a bearing sleeve, the notches of each pair being located between two of the ears, bails having outturned alining terminals bearing in the sleeves of each pair, said bails being adapted to swing within the notches to lapped positions on one surface of the plate and within the notches to converging positions beyond the other face of the plate, said bails, when converging away from the plate, being supported by the inner walls of the notches, those portions of the plate between the notches constituting means for preventing withdrawal of the terminals of the bails from the sleeves when the bails are upstanding from the plate, and the supporting flange constituting means for preventing withdrawal of the terminals of the bails from the sleeves when the bails are folded under the plate.

2. A lifting rack for roasting pans and the like including a plate, there being a pair of notches in each side portion of the plate, an inturned ear adjacent each notch providing a bearing sleeve, the notches of each pair being located between two of the ears, bails having alining terminals bearing in the sleeves of each pair, said bails being adapted to swing within the notches to lapped positions on one surface of the plate and within the notches to converging positions beyond the other face of the plate, there being means integral with the plate for limiting the sliding movement of the alining terminals of the bails relative to the sleeves when said bails are in either of the two positions stated, thereby to prevent withdrawal of said terminals from the sleeves.

In testimony that I claim the foregoing as my own, I have hereto affixed my signature.

ROLLIN E. COLLINS.